April 18, 1933.　　　　K. E. PEILER　　　　1,904,325
ROTARY KNIFE FOR SEVERING MOLTEN GLASS
Filed Dec. 10, 1929　　　2 Sheets-Sheet 1

Witness:
G. A. Duberg

Inventor;
Karl E. Peiler
by Brown & Parham
Attorneys

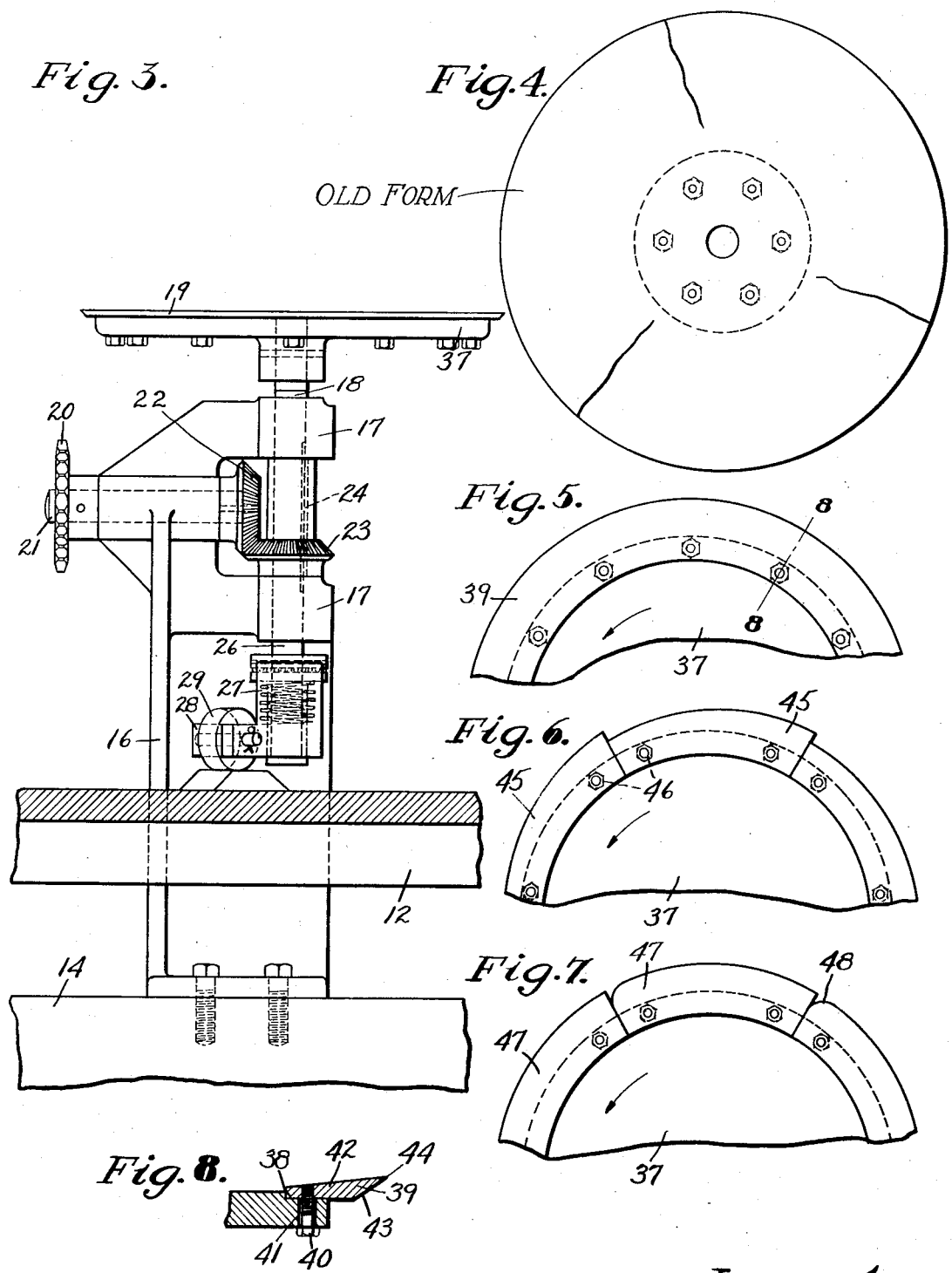

Patented Apr. 18, 1933

1,904,325

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

ROTARY KNIFE FOR SEVERING MOLTEN GLASS

Application filed December 10, 1929. Serial No. 413,005.

This invention relates to mechanism for severing molten glass and particularly to a rotary knife which may be employed for severing the tail of glass depending from a charge of glass in a mold filled by suction from a gathering pool.

It has been proposed heretofore to sever molten glass formed in gobs by suspended charge feeding, and also to sever the tail of glass depending from a suction gathered charge, by means of a rotary knife which is rotated at a relatively high speed. One form of rotary knife heretofore employed consists of a solid disc having a sharp edge, the severing action thereof being effected by relative movement between the disc and the stream of molten glass severed thereby. However, difficulty has been experienced in employing this type of severing device, particularly where said device is employed for severing the tail depending from a suction gathered charge of glass. It not only has been found to be difficult to obtain efficient severing operation by means of such a device, but rotary knives of the character heretofore employed have become defective in use because of the cracking thereof, requiring frequent replacement and undesirable interruption to the production of glassware. Such cracking may be due to the fact that the rotary knife is formed of a single piece of metal and is unduly heated, causing the disc to buckle and crack, and/or to vibration of the disc resulting in crystallization of the metal and subsequent fracture.

The rotary knife possesses certain advantages over other types of molten glass severing devices, and therefore it is desirable to provide such a knife which will not fail in use and which will be dependable. It also is desirable to provide a rotary knife which will have a better severing action than those heretofore employed.

It is an object of this invention to provide a rotary knife for severing molten glass of novel character which will not develop cracks in long periods of use, and which will have an efficient severing action. For the accomplishment of this object, a rotary knife is provided which includes a relatively rigid and heavy disc upon which removably is mounted a comparatively thin cutter. Thus, a rotary knife is provided which possesses the desired cutting action, but which is not subject to fracture, resulting from overheating, or from the crystallization or fatigue of the metal composing the knife.

Another object of this invention is to provide a rotary knife for severing molten glass which is so constructed and arranged that the period of contact of the hot molten glass therewith during the severing operation is a minimum, thereby obviating the tendency of the knife to buckle and crack as a result of undue heating thereof.

A further object of this invention is to provide a rotary knife for severing molten glass of novel construction, characterized by the provision of means for yieldingly holding the knife in contact with the bottom of a suction filled mold during the severing operation as a result of which the knife operates to sever the glass evenly from the bottom of the charge in the mold, and injury to the knife is prevented, which otherwise might result from the edge thereof striking the joint in the mold.

Other objects and advantages of the invention will be pointed out in the detailed description thereof which follows, or will become apparent from such a description.

Generally considered, the rotary knife of the present invention may be supported at one side of a container for a gathering pool from which charges of glass are gathered by suction in a suction mold. The mold moves horizontally across the knife, which projects over the edge of the container, and during the severing period, the knife is raised into yielding engagement with the bottom of the mold, insuring an even cut.

The knife may comprise a rotary disc upon which a removable cutter, or cutters, is mounted. The cutter may take one of several forms, but in each case is removably secured to the disc, and preferably each form of cutter is inclined downwardly and inwardly on top to reduce the surface of contact of the knife with the mold and the glass therein to practically line contact. Thus, undue heating of the cutter is avoided. Each of the cutters preferably is of annular form, and after the mold is moved across the portion of the knife adjacent the container, the knife is lowered to prevent further contact of the mold and the bottom of the charge of glass therein, with the knife. The several forms of cutters are described hereinafter.

Referring in detail to the drawings:

Fig. 3 is a view in front elevation and partly in longitudinal vertical section of my novel glass severing mechanism, the container for the gathering pool being omitted;

Fig. 4 is a view in top plan of an old form of rotary knife, illustrating the development of cracks therein;

Fig. 5 is a view in top plan of a fragmentary portion of the rotary knife shown in Figs. 1, 2 and 3;

Fig. 6 is a view similar to Fig. 5, illustrating a modification of the construction shown in Fig. 5;

Fig. 7 is a view similar to Fig. 5 of still another modification of the construction shown in Fig. 5; and Fig. 8 is a view in vertical section of a portion of the knife shown in Fig. 5, taken on the line 8—8 of said Fig. 5.

Figure 1:
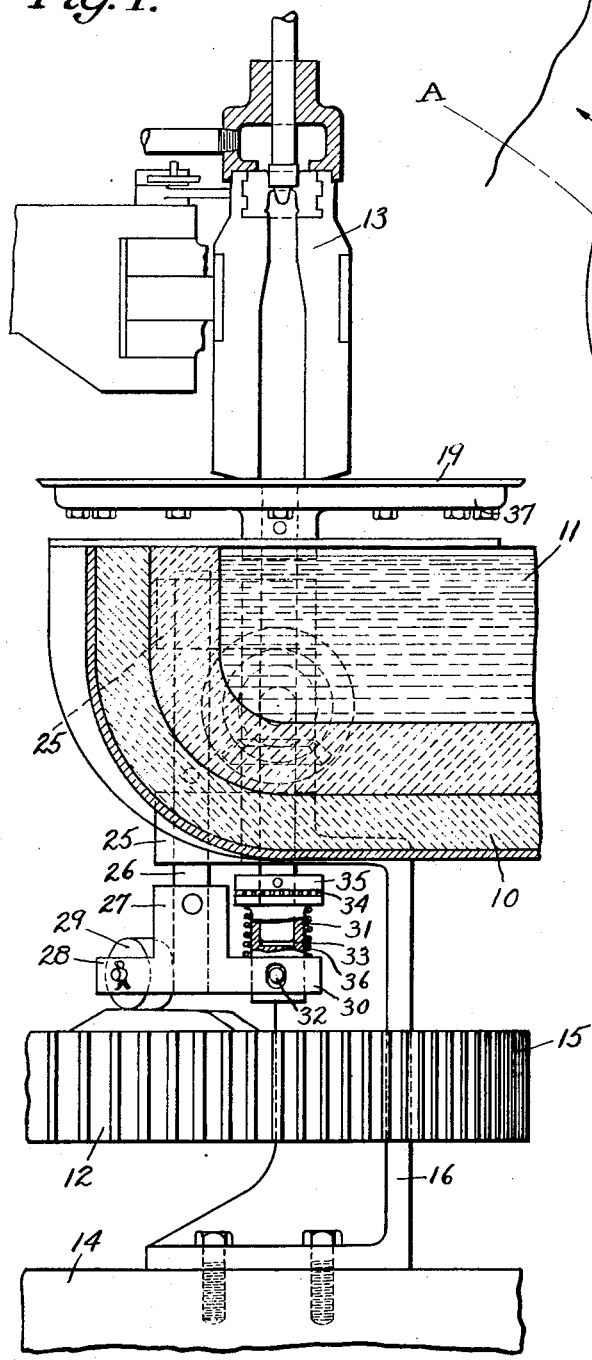
Figure 1 is a view partly in elevation and partly in vertical longitudinal section of fragmentary portions of a glass forming machine and a container for a pool of molten glass, and showing the construction and arrangement of my novel glass severing mechanism mounted in cooperative relation therewith, said view being taken on the line 1—1 of Fig. 2.
Figure 2:
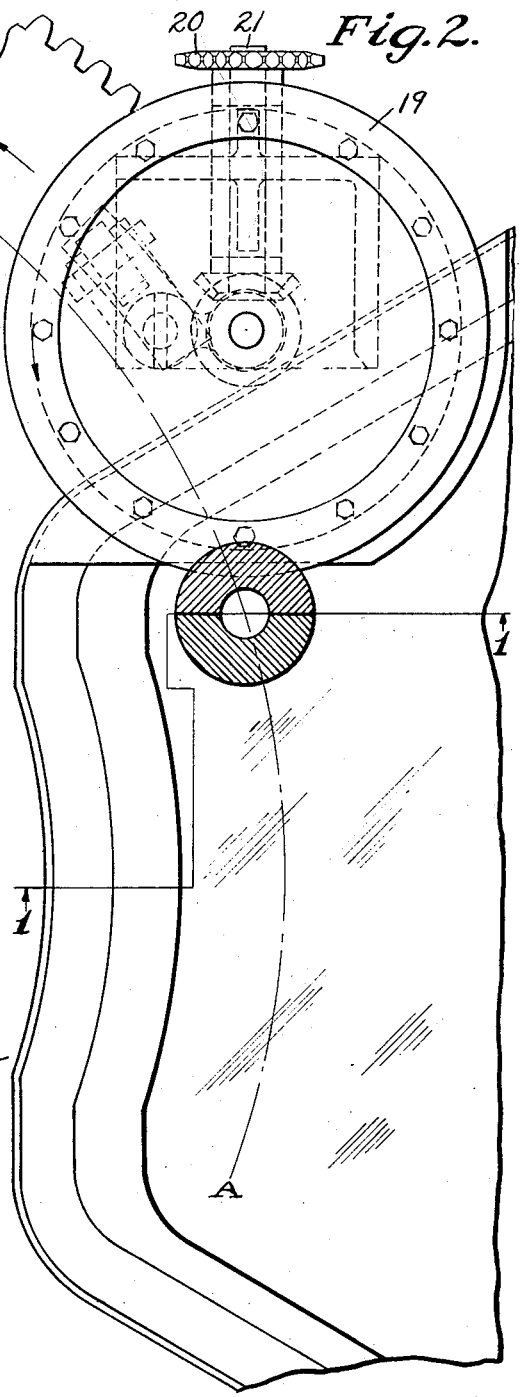
Fig. 2 is a view in top plan of the apparatus shown in Fig. 1.

Referring to Figs. 1 and 2, an extension 10 of a glass melting tank is shown, containing a pool of glass 11. Adjacent the extension 10 a rotary glass forming machine is located including a table 12 upon which is suitably mounted, by means not shown, a suction mold 13. The suction mold 13 is suitably supported upon the table 12 for movement into and out of contact with the pool 11, in known manner. The table 12 may be mounted upon a column, not shown, carried by a base 14 and may be driven either continuously or intermittently by suitable driving mechanism connected to the gear 15 formed on the periphery of the table 12.

Mounted upon the base 14 is a vertical bracket 16 having bearings 17 formed therein in which a vertical shaft 18 is journaled. Mounted upon the upper end of the shaft 18 is a rotary knife designated generally at 19.

The knife 19 is rotated at a relatively high rate of speed by suitable driving mechanism, not shown, including a chain which engages a sprocket wheel 20 mounted on the outer end of a horizontal shaft 21, suitably journaled in the bracket 16, as shown in Fig. 3. A bevel gear 22 mounted on the inner end of shaft 21 meshes with a similar bevel gear 23, having a slidable connection with shaft 18, said connection being provided by a spline as indicated at 24. By means of this construction, the rotary knife 19 may be rotated at the desired speed and the shaft 18 which carries the knife may be reciprocated vertically independently of the driving mechanism to raise the knife into engagement with the bottom of the mold 13 during the severing period, and to lower the knife out of contact with the mold.

As the mold 13 is raised out of contact with the pool 11, it is swung across the knife 19 which at this time is raised to hold the knife in contact with the bottom of the mold by the following means: Loosely mounted in a pair of spaced laterally projecting lugs 25 formed on the bracket 16 is a reciprocating rod 26. Secured to the bottom of the rod 26 is a member 27 on the bottom of which are formed a pair of laterally extending lugs 28 between which a cam roller 29 is mounted, and an arm 30 extending laterally with respect to the rod 26 and oppositely to the lugs 28.

Loosely mounted in the arm 30 is a thrust bearing 31. Bearing 31 is positioned in an opening in the arm 30 and loosely held therein by a pin 32 extending through slots in said arm. Bearing 31 is recessed as indicated at 33 to receive the bottom end of shaft 18 which is supported by the bearing 31 by means of ball bearings 34 located in a raceway formed in a collar 35 rigidly secured to the shaft 18, and in the enlarged top of the bearing 31. The bearing 31 in turn is yieldingly supported by a compression spring 36 encircling the bearing and resting upon the arm 30. By means of this construction, the shaft 18 and the knife carried thereby, are yieldingly supported by the arm 30 upon a frictionless bearing provided by the ball bearings 34.

The knife 19 is raised into yielding engagement with the bottom of mold 13 at the appropriate time and held in such engagement for the desired period by means of a cam 36, formed on the table 12.

The rotary knife 19 comprises a relatively rigid disc 37 having an annular recess 38 formed therein in which recess, either one of the several forms of cutters may be removably mounted. In the construction shown in Figs. 1, 2, 3, and 5, the removable cutter comprises an annulus 39 secured in the recess 38 by means of bolts 40, extending through openings 41 located at spaced intervals in the disc 37 near the periphery thereof. The cutter 39 has approximately the cross section shown in Fig. 8, the top surface thereof being inclined downwardly and inwardly as indicated at 42 and the outer edge thereof being sharply inclined downwardly and inwardly as indicated at 43. Thus, a sharp cutting edge 44 is provided on the cutter, which affords substantially a line contact of the cutter with the bottom of the mold and with the bottom of the charge of glass in the mold when the mold is moved across the knife, during the severing period. The cutter 39 may be exchanged with another similar cutter upon becoming dull or otherwise defective.

In the modification shown in Fig. 6, the cutter is formed in a plurality of segments 45 which, when secured in the recess 38 of the disc 37 by bolts indicated at 46, form, in effect, an annulus. The segments 35 are of gradually increasing width from the forward ends thereof to the rear ends thereof, the knife being rotated in the direction indicated by the arrow in Fig. 6. Thus, each cutter has a progressively deepening cutting action. The segments 45 being formed separately, the edge of the cutter is somewhat more resilient than the cutter illustrated in Fig. 5, each segment being free to flex very slightly independently of the others thereof. This tends to prevent cracking of the cutter, but in the event that one of the segements 45 should crack or break, it only is necessary to replace that particular segment, which may be accomplished in a very short time.

In the construction shown in Fig. 7, the cutter is formed in a plurality of segments 47 similar to segments 45, each segment being of the same width throughout its length, but the forward outer corner thereof is rounded as indicated at 48. The knife is rotated in a direction indicated by the arrow in said figure.

The cross sections of the cutters shown in Figs. 6 and 7, are substantially the same at their widest portion at least, as that of the cutter 39, as illustrated in Fig. 8.

The operation of the apparatus described above briefly is as follows:

The knife 19 is rotated continuously and after the mold 13 has been dipped into contact with the pool 11 and filled with glass, it is raised and moved horizontally toward the knife. The path of the mold is indicated by broken line A—A in Fig. 2. At the instant that the edge of the mold is above the edge of the knife, the knife is elevated by roller 29 riding up the inclined portion of the cam 36. As the mold continues to move, the knife is yieldingly held in engagement with the bottom of the mold by the flat portion of cam 36 and the bottom of the mold moves across the forward edge portion of the cutter. When the tail of glass has completely been severed from the charge, roller 29 rides down the downwardly inclined portion of cam 36, removing the knife from engagement with the bottom of the mold, and the tail of glass drops back into the pool 11. It will be observed that only the cutting edge 44 of the knife engages the bottom of the mold and the charge of glass therein such engagement terminating with the completion of the severing of the tail of glass, so that the heating effect of the mold and glass on the knife is minimized. Moreover, the line contact of the knife with the bottom of the charge of glass tends to avoid undue chilling of the glass, as a result of which there will be little if any tendency for the knife to form a scar on the bottom of the charge.

Various changes in the details of construction of the severing mechanism disclosed herein may be made without departing from the appended claims. Although the severing mechanism is illustrated in combination with a suction gathering forming machine, it will be obvious that it may be employed for severing mold charge masses of molten glass, supplied to molds or other glass fabricating means, in any other manner.

Having thus described my invention, what I desire to claim and to secure by Letters Patent is:

1. Apparatus for fabricating glassware comprising, glass shaping mechanism containing molten glass a portion of which protrudes from said mechanism, said mechanism having a shear bearing surface, a rotary knife associated with said mechanism, means for holding said knife in line contact with said bearing surface, and means for producing relative movement between said mechanism and knife to sever said portion of glass protruding from said mechanism.

2. Apparatus for fabricating glassware comprising, glass shaping mechanism containing molten glass a portion of which protrudes from said mechanism, said mechanism having a shear bearing surface, a rotary knife associated with said mechanism, means for holding said knife in contact with said bearing surface, the surface of the knife adjacent the bearing surface being inclined with respect thereto to provide line contact between said knife and said bearing surface, and means for producing relative movement between said mechanism and knife to sever the portion of glass protruding from said mechanism.

3. Mechanism for severing molten glass comprising a rotary knife, means for rotating said knife about its axis, and means for reciprocating said knife in the direction of its axis.

4. Mechanism for severing molten glass comprising a rotary knife, means for rotating said knife about its axis, and a yielding support for said knife for permitting axial movement thereof.

5. Mechanism for severing molten glass comprising a rotary knife, means for rotating said knife about its axis, and means for intermittently reciprocating said knife in the direction of its axis.

6. Mechanism for severing molten glass comprising a rotary knife, means for rotating said knife about its axis, means for intermittently reciprocating said knife axially, and resilient means for permitting axial movement of said knife independently of said reciprocating means.

7. In combination with a glass forming machine including a mold adapted to be dipped into a pool of glass to gather a charge of glass by suction, a rotary knife for severing the tail of glass depending from the charge, means for rotating said knife about its axis, and means operating in synchronism with said machine for axially reciprocating said knife to hold said knife in engagement with the bottom of said mold during the severing period.

8. In combination with a glass forming machine including a mold adapted to be dipped into a pool of glass to gather a charge of glass by suction, a rotary knife for severing the tail of glass depending from the charge, means for rotating the knife about its axis, and means for holding the knife in contact with the bottom of the mold during the severing period, said knife having a cutting edge located in a plane above the top of the remaining portion thereof for providing line contact between the knife and the bottom of the mold.

9. In combination with a glass forming machine including a mold adapted to be dipped into a pool of glass to gather a charge of glass by suction, a rotary knife for severing the tail of glass depending from the charge, means for rotating the knife about its axis, means operating in synchronism with the machine for axially reciprocating the knife to hold the knife in engagement with the bottom of the mold during the severing period, said reciprocating means including means for yieldingly supporting the knife in engagement with the mold.

10. In combination with a glass forming machine including a mold adapted to be dipped into a pool of glass to gather a charge of glass by suction, said mold being rotated toward and away from the gathering pool, a rotary knife for severing the tail of glass depending from the charge in said mold, means for rotating the knife about its axis, means operating in syncronism with the rotation of the mold for elevating the knife into engagement with the bottom of the mold, for holding the knife in engagement with the mold until the tail is severed, and for thereafter lowering the knife out of engagement with the mold.

11. In combination with a glass forming machine including a mold adapted to be dipped into a pool of glass to gather a charge of glass by suction, a rotary severing mechanism for severing the tail of glass depending from the charge, said mechanism including a disc, a rotary shaft to the top of which said disc is connected, a substantially annular blade removably secured to said disc, the cutting edge of which lies in a plane substantially at a right angle to the axis of the shaft, means for rotating said shaft and the blade, and means for holding the blade in engagement with the bottom of the mold during such rotation to effect a severing operation.

12. In combination with a glass forming machine including a mold adapted to be dipped into a pool of glass to gather a charge of glass by suction, a rotary severing mechanism for severing the tail of glass depending from the charge, said mechanism including a disc, a rotary shaft to the top of which said disc is connected, a cutter of substantially annular shape secured to the periphery of said disc, said cutter comprising a plurality of segments removably secured to said disc, the cutting edges of which are located in a plane at right angles to the axis of said shaft, means for rotating said shaft and the cutter, and means for holding the cutter in engagement with the bottom of the mo'd during such rotation to effect a severing operation.

13. In combination with a glass forming machine including a mold adapted to be dipped into a pool of glass to gather a charge of glass by suction, a rotary severing mechanism for severing the tail of glass depending from the charge, said mechanism including a disc, a rotary shaft to the top of which said disc is connected, a cutter on said disc comprising a plurality of segments removably secured to the disc, the cutting edges of said segments being located in a plane above the remaining portions thereof and above the disc, and which plane is at right angles to the axis of said shaft, means for rotating said shaft and the cutter, and means for holding the cutter in engagement with the bottom of the mold during such rotation to effect a severing operation.

Signed at Hartford, Connecticut, this 5th day of December, 1929.

KARL E. PEILER.